United States Patent Office 3,047,588
Patented July 31, 1962

3,047,588
EPOXY CYANOHYDRINS
Paul R. Van Ess, Berkeley, Calif., assignor to Shell Oil Company, New York, N.Y., a corporation of Delaware
No Drawing. Filed Apr. 18, 1960, Ser. No. 22,659
7 Claims. (Cl. 260—348)

This invention relates to novel cyanohydrins and to a process for preparing them. More particularly, the invention relates to new epoxy cyanohydrins and to their synthesis from epoxy carbonylic compounds.

Aldehydes and ketones react with hydrocyanic acid to form cyanohydrins by the reaction

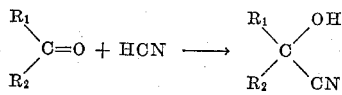

and such cyanohydrins are useful chemical compounds, primarily as intermediates. Since hydrocyanic acid is also capable of opening epoxy rings, hydroxy nitrile compounds may also be prepared by the reaction of such epoxy compounds as epichlorohydrin with hydrocyanic acid

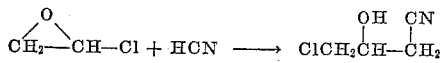

This reaction is accelerated by the presence of an alkaline reagent in the reaction medium. Such reactions are also characteristic of the alkali metal salts of hydrocyanic acid such as sodium and potassium cyanide.

I have, however, successfully prepared epoxy cyanohydrins characterized by epoxy rings as well as a cyanohydrin group. These compounds, in addition to their novelty, are useful in both conventional and unconventional ways. For example, besides serving as an intermediate in the preparation of resins, the epoxy cyanohydrins may themselves be polymerized and copolymerized through the epoxy ring to yield resinous substances containing unreacted cyanohydrin functions.

I have unexpectedly discovered that such novel epoxy cyanohydrins, in which the epoxy group is preserved intact, may be prepared from epoxy carbonylic compounds. One object of this invention is therefore the production of such new and useful epoxy cyanohydrins, and another is the provision of a process for their preparation. The process whereby the epoxy cyanohydrins may be prepared from epoxy carbonylic compounds is yet another object of the invention, as is the selection of conditions whereby the cyanohydrins are produced without attack on the epoxy ring. Other objects will be apparent from the following description of the invention.

These and other objects are accomplished by the new epoxy cyanohydrins, which comprise aliphatic compounds having an epoxy-substituted alkyl radical attached to a carbon atom to which are directly connected a hydroxy group and a nitrile group. They may therefore be generally described by the formula

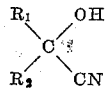

wherein $R_1$ is an epoxy-substituted alkyl radical and $R_2$ is selected from the group consisting of epoxy-substituted alkyl radicals, alkyl radicals and the hydrogen atom.

Examples of such compounds include 1-hydroxy-3,4-epoxy-n-butyl cyanide; glycidyl cyanohydrin; 1,2-epoxy-4 - hydroxy - 4 - cyanopentane; 1,2,6,7 - diepoxy - 4 - hydroxy-4-cyanohexane; and 2,3,4,5-diepoxy-1-hydroxy-n-pentyl cyanide.

My invention may be best understood by a consideration of the novel process by which the epoxy cyanohydrins are prepared. The process consists, in general, of reacting together an aliphatic epoxy carbonylic compound selected from the group consisting of aldehydes and ketones with an inorganic cyanide in the presence of a catalytic amount of a tertiary amine. The epoxy carbonylic compounds I employ are those which are prepared by the epoxidation of the double bonds in unsaturated aliphatic aldehydes and ketones. They are characterized by their possession of at least one vicinal epoxy or oxirane group,

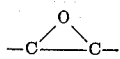

and by having a carbonylic substituent selected from the group of monovalent radicals consisting of formyl and ketonic radicals, that is, radicals having the structure

where R is either the hydrogen atom or a monovalent hydrocarbyl radical.

Examples of unsaturated aldehydes which may be epoxidized to yield the epoxy compounds of this invention include methacrolein, crotonaldehyde, tiglic aldehyde, citral, and other aldehydes having one alpha,beta-olefinic double bond. Also included are epoxyaldehydes of unsaturated aldehydes having one or more double bond further removed from the formyl group, such as vinyl acetaldehyde, 3-pentenal, 4-pentenal, methyl vinyl acetaldehyde, isopropenyl acetaldehyde, citronellal, rhodinal, and 2-phenyl-4-hexenal. Of these compounds, the alkyl alpha,beta-monoepoxyaldehydes are preferred, especially those having 1 to 8 carbon atoms, both because of their considerable reactivity and because of the desirable nature of the products of the invention. The most preferred alkyl alpha,beta-monoepoxyaldehyde is glycidaldehyde, that aldehyde prepared by the epoxidation of acrolein.

Equally suitable as epoxy carbonylic reactants in the process of my invention are epoxy ketones. As in the case of epoxyaldehydes, epoxy ketones are synthesized by epoxidation of unsaturated ketones. Examples of suitable ketones include methyl vinyl ketone, ethyl allyl ketone, mesityl oxide, phorone, and the like. Preferred epoxy ketones are those wherein the oxygen atom of at least one epoxy ring is connected to the alpha and beta carbon atoms with respect to the carbonylic carbon atom. Naturally, epoxy compounds having a plurality of formyl or ketonic carbonylic groups, such as 2,3-epoxybutanedial and 2,3-epoxy-4,6-heptanedione, are also suitable for use in my process.

Of these classes of epoxy carbonylic compounds, the most reactive is that comprising the epoxyaldehydes, while the aliphatic epoxy ketones are somewhat less reactive.

The epoxy carbonylic compounds are reacted in the liquid phase under preferably anhydrous conditions with inorganic cyanides in the presence of an amine catalyst. The catalyst is an important feature of my invention, since I have observed that in its absence the epoxy compounds do not react with the cyanides at all. However, when the catalyst is employed, the cyanides readily react to yield the desired cyanohydrins. The cyanides have the general formula XCN where X is the hydrogen atom or an alkali metal atom. Representative cyanides are thus hydrogen cyanide, i.e., hydrocyanic acid, potassium cyanide, sodium cyanide and lithium cyanide. Because hydrogen cyanide lends itself most readily to the anhydrous liquid phase reaction, I prefer to employ it as the cyanide reactant. Since at room temperature, hydrogen cyanide is a toxic gas, it is most conveniently handled as a solution in some anhydrous inert liquid such as dioxane or other solvents well known to organic chemists.

The catalysts which are employed as catalysts are those derivatives of ammonia in which each of the ammoniacal hydrogen atoms has been replaced with a hydrocarbyl radical. Examples include the trialkylamines such as methyl diethylamine, tri-n-propylamine, triisobutylamine, and tri-n-hexylaimne, mixed aromatic and alkylamines, such as diethylaniline, dimethylaniline, and ethylbenzylaniline, while tertiary aromatic amines, such as triphenylamine, are also operative. Of these tertiary amine catalylsts, the least expensive are as useful as the remainder of the class, and it is therefore convenient to use the trialkylamines in my process, the most available and plentiful compounds being those having less than eight carbon atoms. While it is not important whether the three alkyl radicals have the same number of carbon atoms or not, I have found that triethylamine and trimethylamine are both useful in my process.

The proportions of reactants and catalyst in my process are governed by the conditions under which the process is conducted. In general, about one mole of cyanide is required for every mole of carbonyl. The amount of catalyst employed will be dictated by the speed at which it is desired that the reaction proceed. When conducting the reaction at temperatures on the order of 20° C., catalytic amounts of the amine ranging from about 1 to 10 mole percent, based on the epoxy carbonylic compound, maintain the reaction rate within reasonable limits.

The reaction rate is also controlled by the temperature at which the process is conducted. The epoxyalkyl aldehydes, such as glycidaldehyde and 2,3-epoxybutanal, react vigorously with inorganic cyanides in the presence of an amine catalyst at temperatures from about 0° C. to about 35° C., but higher temperatures may be required when using less reactive epoxy carbonylic compounds such as epoxy ketones.

While the use of diluents for the conduct of the reaction is not necessary, such diluents are convenient for the purposes of heat exchange and reaction rate control. The preparation of my novel epoxy cyanohydrins may be carried out in almost any inert solvent with which the reactants and catalyst are miscible, but since they tend to dissociate in the presence of polar liquids, the use of non-polar organic solvents is preferable. Although methanol and ethanol may be used, the yield of product is far better when butyl or higher alcohols, chloroform, carbon tetrachloride, or dioxane are employed. At the close of the reaction, the epoxy cyanohydrins may readily be separated from such reaction mixtures by well-known techniques including extraction and vacuum distillation.

The following examples will serve to illustrate the nature of my process and of my novel epoxy cyanohydrins. It should be understood, however, that the examples are merely illustrative and are not to be regarded as limitations on the appended claims, since the basic teachings therein may be limited at will as will be understood by those skilled in the art. Unless otherwise indicated, the amounts of ingredients are expressed in parts by weight.

*Example I*

Anhydrous glycidaldehyde was added at room temperature to an anhydrous solution of dioxane containing an equimolar amount of hydrocyanic acid (4.6% HCN by weight). No reaction took place until 5% by weight of triethylamine, based on the glycidaldehyde, was stirred slowly into the solution, whereupon an exothermic reaction was immediately initiated. The mixture was stirred and the temperature thereof was observed to rise to a maximum of 35° C.

At the close of the reaction, an aliquot of the reaction mixture was taken and analyzed for epoxy and carbonyl content. The epoxy value of the aliquot was exactly that calculated for the glycidaldehyde solution, but no carbonyl could be detected.

The solvent dioxane was stripped from the reaction mixture at a kettle temperature of 20–25° C. under 1 mm. of mercury. The residue consisted of a mobile oily lightyellow liquid. Upon analysis, the following data were obtained.

|  | N, percent | Epoxy Value, eq./100 g. |
|---|---|---|
| Calculated for $C_4H_5O_2N$ | 14.1 | 1.0 |
| Found | 12.9 | 0.88 |

On the basis of analytical data, it was calculated that a 95% yield of glycidyl cyanohydrin having the formula

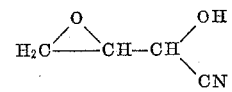

was obtained. The compound was soluble in water, methanol and hot ethanol but insoluble in diethyl ether and benzene.

*Example II*

Using the methods of the previous example, the following epoxy cyanohydrins may be readily prepared in excellent yield.

| Epoxy Reactant | Cyanide Reactant | Amine Catalyst | Epoxy Cyanohydrin Product |
|---|---|---|---|
| 2,3-epoxy-2-methyl propanal. | HCN | trimethylamine | 2,3-epoxy-2-methyl-1-hydroxy propyl cyanide. |
| mesityl oxide epoxide. | HCN | triethylamine | 2-cyano-2-hydroxy-3,4-epoxy-4-methyl pentane. |
| 2,3,4,5-diepoxy pentanal. | KCN | dimethylaniline | 1-hydroxy-2,3,4,5-diepoxy pentyl cyanide. |
| 2,3-epoxy butanal | NaCN | tri-n-propyl-amine. | 1-hydroxy-2,3-epoxy-butyl cyanide. |
| 2,3-epoxy-2-methyl propanal. | KCN | triethylamine | 1-hydroxy-2,3-epoxy propyl cyanide. |
| 1,2-epoxy-2-methyl butan-3-one. |  | trimethylamine | 1,2-epoxy-2-methyl-3-hydroxy-3-cyano-butane. |

The epoxy cyanohydrins of the invention have a variety of uses. By reacting them with such curing agents as amines or amides including m-phenylene diamine, ethylene diamine, urea, hydroxyurea, phenyl thiourea and the like, they may be homopolymerized. The amount of catalyst employed will vary from about 0.1% to about 10% by weight, and polymerization may be accomplished at temperatures between about −15° C. and about 100° C.

Useful polymers may also be obtained by polymerizing the epoxy cyanohydrins of the invention with other polymerizable compounds. For example, by using the curing agents noted, they may be polymerized with other types of epoxy-containing materials such as ethylene oxide, propylene oxide, isobutylene epoxide, epichlorohydrin, vinyl cyclohexene dioxide, butadiene mono- or dioxide, and epoxy ethers such as diglycidyl ether and the glycidyl ether of polyhydric phenols and bisphenols.

The polymers prepared from the monoepoxy compounds, such as the homopolymers of the epoxy cyanohydrins, and the copolymers of the epoxy cyanohydrins with other monoepoxides, are useful in coating compositions, impregnating compositions and as additives for lubricating oils as viscosity index improvers and pour point depressants. The copolymers of the epoxy cyanohydrins and polyepoxy compounds are hard resinous materials whose properties are superior to those of the copolymerized polyepoxy compounds alone. Both the solid cured homo- or copolymers are themselves useful as adhesives, potting resins, surface coatings and the like.

*Example III*

When glycidyl cyanohydrin is cured with 0.7% w. m-phenylene diamine at 50° C., the product is a hard darkcolored resin characterized by superior toughness and heat stability.

The resinous solid was also obtained by spontaneous polymerization when the glycidyl cyanohydrin was allowed to stand at room temperature for several weeks.

This application is a continuation-in-part of my copending patent application Serial No. 751,877, filed July 30, 1958, now abandoned.

I claim as my invention:

1. The epoxy cyanohydrin of the structure

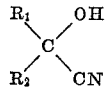

where $R_1$ is vicinal epoxy-substituted alkyl and $R_2$ is selected from the group consisting of vicinal epoxy-substituted hydrocarbon alkyl, hydrocarbon alkyl and the hydrogen atom, $R_1$ and $R_2$ having a total of up to 11 carbon atoms.

2. The epoxy cyanohydrin of the structure

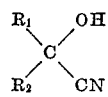

wherein $R_1$ is vicinal epoxy-substituted hydrocarbon alkyl and $R_2$ is hydrocarbon alkyl, $R_1$ and $R_2$ having a total of up to 11 carbon atoms.

3. The epoxy cyanohydrin of the structure $$R_1CH(OH)(CN)$$

wherein $R_1$ is vicinal epoxy-substituted hydrocarbon alkyl of up to 11 carbon atoms.

4. The epoxy cyanohydrin of claim 1 wherein each epoxy group includes carbon atoms alpha and beta to the carbon atom to which the hydroxyl group is attached.

5. Glycidyl cyanohydrin.

6. 2-cyano-2-hydroxy-3,4-epoxy-4-methyl pentane.

7. 1,2-epoxy-3-hydroxy-3-cyanobutane.

No references cited.